United States Patent [19]
Neiheisel

[11] Patent Number: 5,948,172
[45] Date of Patent: Sep. 7, 1999

[54] DESCALING METAL WITH A LASER HAVING A VERY SHORT PULSE WIDTH AND HIGH AVERAGE POWER

[76] Inventor: Gary L. Neiheisel, 4038 Wildcherry Ct., Cincinnati, Ohio 45248

[21] Appl. No.: 08/972,350

[22] Filed: Nov. 17, 1997

Related U.S. Application Data

[62] Division of application No. 08/695,930, Aug. 12, 1996, Pat. No. 5,736,709.

[51] Int. Cl.⁶ .................................................. B08B 7/00
[52] U.S. Cl. .............................................. 134/1; 134/21
[58] Field of Search .................................. 134/1, 15, 19, 134/21, 42; 216/121.6, 121.61, 121.76, 121.82

[56] References Cited

U.S. PATENT DOCUMENTS

| | | | |
|---|---|---|---|
| 4,063,063 | 12/1977 | Funck | 219/121 |
| 4,368,080 | 1/1983 | Langen et al. | 134/1 |
| 4,720,621 | 1/1988 | Langen | 219/121 |
| 4,826,299 | 5/1989 | Powell | 350/432 |
| 5,151,134 | 9/1992 | Boquillon et al. | 134/1 |

FOREIGN PATENT DOCUMENTS

| | | |
|---|---|---|
| 3705603 | 1/1988 | Germany . |
| 53688 | 3/1984 | Japan . |
| 197588 | 8/1990 | Japan . |

OTHER PUBLICATIONS

Benson et al, "Development Of An Accelerator Ready Photo Cathode Drive Laser At CEBAF", presented at the Process Particle Accelerator Conference, 1995, Dallas.

Schulter et al, "Descaling of Austenitic Steels by Laser Radiation", Proc. ICALEO 94, Orlando, Fla., Oct. 17–20, 1994.

Weher et al, "Ablation of Oxide Layers on Metallic Surfaces by Excimer Laser Radiation", Proc., ECLAT 90, vol. 2, pp. 917, 1990.

"Free Electron Lasers For Industry", vol. I and II, May 1995, Department Of Energy.

"Solvent Substitution", The First Annual International Workshop On Solvent Substitution, Dec. 4–7, 1990, Phoenix, Arizona.

Primary Examiner—Lyle A. Alexander
Assistant Examiner—Alexander Markoff
Attorney, Agent, or Firm—R. J. Bunyard; L. A. Fillnow

[57] ABSTRACT

The invention relates to an apparatus for using laser radiation to remove an oxide layer (scale) by vaporization from a hot rolled or annealed steel strip (40) traveling in a gravitationally vertical direction at a speed of at least 10 m/min. The apparatus includes a high power laser such as a free electron laser and a sealed interaction chamber (90) containing a non-oxidizing gas (108). The electromagnetic radiation from the laser has a surface power density of at least about 5 MW/cm² at a point of contact with the metal strip surface. The radiation is passed through an optical system of aligned lenses or mirrors for focusing the radiation into a straight line projected transversely completely across the strip. The radiation has a pulse width less than 100 picoseconds, a pulse repetition rate greater than 10 MHz and a high average power of at least 10 kW. A radiation beam (56) is passed through a homogenizer (60) having a linear diverging lens (74) for spreading the radiation in a linear transverse direction. The radiation is passed through a cylindrical convergent lens (78) or a long cylindrical mirror (132) and focused into a straight line beam (36) projected completely across the width of the strip. The oxidized strip passes into the sealed chamber through a slotted entry (91) and exits the sealed chamber through a slotted exit (92). The sealed chamber includes at least one elongated window (93) for receiving the radiation, an exhaust duct (94) for removing the non-oxidizing gas ladened with oxide debris from the chamber and a filter (106) for removing oxide powder from the gas. The non-oxidizing gas is directed into the chamber at a point just above a plasma plume (112) and just beyond incident focused radiation beam (36) through a long slot-like gas nozzle (114). By keeping the chamber sealed from the ambient atmosphere and maintaining sufficient non-oxidizing gas adjacent to the plasma interaction zone and the cleaned metal surface, reoxidation of the cleaned steel surface can be prevented.

38 Claims, 12 Drawing Sheets

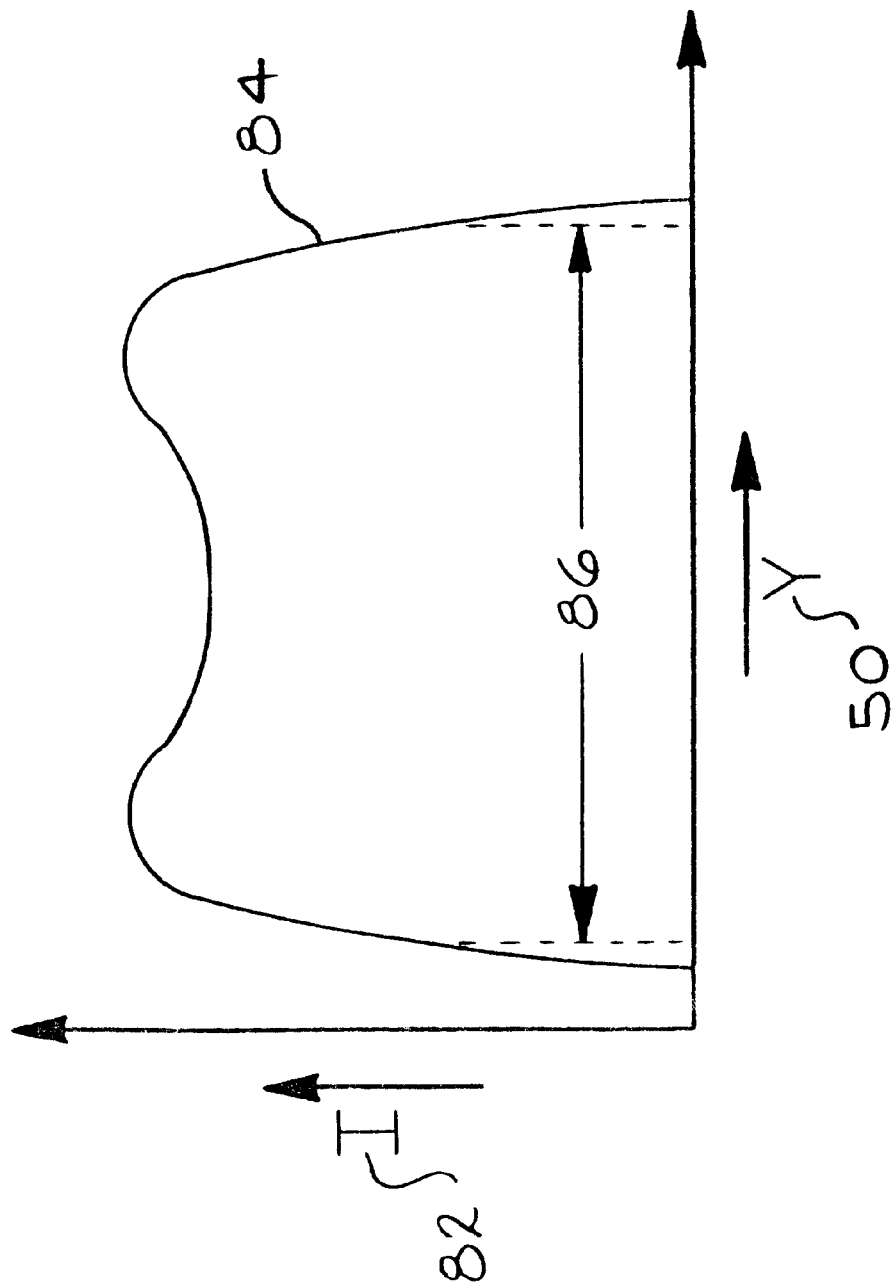

DESCALING METAL WITH A LASER HAVING A VERY SHORT PULSE WIDTH AND HIGH AVERAGE POWER

This application is a division of application Ser. No. 08/695,930, filed Aug. 12, 1996 now U.S. Pat. No. 5,736,709.

BACKGROUND OF THE INVENTION

This invention relates to a process and apparatus for using electromagnetic radiation for removing oxide from metal. More specifically, the invention includes using a pulsed laser to produce electromagnetic radiation having a very short pulse width, a very high pulse repetition rate and a high average power to descale the metal by vaporizing molecular layers of the oxide with each pulse.

One of the more environmentally intensive operations in the metal making industry is the wet acid pickling of a metal such as steel to remove oxide or scale formed during hot processing such as forging, rolling on a hot strip mill, or annealing. The techniques for removing this scale have changed little since the beginning of the century. Most low carbon and electrical steel strip are immersion pickled in hydrochloric acid at strip speeds of about 250 m/min. Stainless steel has a more tightly adhering scale and may require shot blasting or roller leveling to loosen or crack the scale prior to acid pickling. Additionally, stainless steel pickling requires more aggressive acids such as hydrofluoric, sulfuric, or nitric and requires longer immersion times resulting in processing line speeds for strip of about 30–100 m/min. A major motivation for improving or eliminating this type of scale removing process is the capital and environmental disposal costs of the acids associated with pickling. The annual cost associated with a single production line could be as much as $8 million dollars for disposal of hazardous acid alone. A major disadvantage of chemical descaling processes is the environmental problems related to disposal of the chemicals used for pickling.

It is known to remove or assist in the removal of scale from steel using a laser. For example, U.S. Pat. No. 4,063,063 relates to a process for descaling metal products by irradiating a metal surface with a $CO_2$ laser beam of sufficient intensity to produce a rapid and intense local heating of an oxide film. The laser described in this patent may have a beam power up to 10 kW. However, subsequent work has revealed that it is not possible to completely remove the oxide scale using pulsed or continuous wave $CO_2$ lasers at comparable line speeds to that achieved by acid pickling. Only an unreasonably large and costly number of lasers could achieve comparable descale rates.

Japanese patent application 2-197588 relates to a method for removing scale or rust from steel. Scale or rust on the steel is irradiated with a laser beam in a UV wavelength region of the electromagnetic spectrum such as an excimer laser beam having a 100–400 nm wavelength for $\leq 200$ nsec pulse duration time to cause fine cracking of the scale or rust. Since the power of an excimer laser is limited to about 300 Watts and a pulse repetition rate less than 1 kHz, it also would be necessary to have an unreasonably large and costly number of excimer lasers to descale the steel at economic line speeds.

$CO_2$, Nd:YAG, and excimer lasers represent the most common high average power industrial lasers over the wavelength range from far infrared ($CO_2$ at 10.6 microns) to the near infrared (Nd:YAG at 1.064 microns) to the ultraviolet excimer (XeCl at 0.308 microns, KrF at 0.248 microns, and ArF at 0.193 microns). In order to obtain high descale rates, it is necessary to use very high power lasers. Many of the high average power, e.g., greater than 1 kW, commercially available lasers operate in a continuous wave (CW) mode. CW operation presents problems for scale removal due to the absorption of the incident laser beam by the plasma plume generated by the removed elemental components. This is caused by the relative long dwell times associated with CW laser processing. This has been confirmed by work done by Schluter, et al disclosed in an article entitled *Descaling of Austenitic Steels by Laser Radiation*, Proc. ICALEO 94, Orlando, Fla., Oct. 17–20, 1994. This same article presents data showing that even pulsed $CO_2$ lasers are inefficient at oxide removal because the pulse duration is long enough for the incoming laser beam to interact with the created plasma plume so that some of the incoming laser energy is absorbed by this plasma thereby not removing additional oxide. The net result is a low descale rate. Wehner et al. disclose in an article entitled *Ablation of Oxide Layers on Metallic Surfaces by Excimer Laser Radiation*, Proc. ECLAT 90, V2, pp. 917, that short pulses, e.g., 10–250 nanoseconds, from an excimer laser are more efficient at removing the oxide layers but these lasers are only available in low average power, e.g., less than 250 W, and low repetition rates, i.e., less than 1 kHz. A simple "ball park" estimate by applicant based on covercoming the heat of vaporization of the oxide layer reveals that to remove a 5 micron thick aluminum oxide layer from one side of a 1 m wide aluminum surface moving at 31 m/min requires an average laser power of 100 kW. Although a 45 kW $CO_2$ laser is commercially available from Trans Tec/Convergent Energy, it operates in a CW mode. Thus, even if two of these 45 kW lasers were used to cover a 1 m wide aluminum surface, the desired descale rate will not be achieved because of the plasma absorption problems associated with CW or long pulse width lasers just mentioned. To obtain this kind of power from short pulse width excimer lasers is possible only by using a large number, e.g., 400, of lasers each treating some small fraction of the desired full width material. Thus, conventional industrial lasers are not suited for economic removal of steel oxide layers.

A major disadvantage of these prior art laser descaling processes is complete scale removal from a steel strip traveling at a high speed was not possible. Alternatively, the slow strip speeds required for complete scale removal by conventional laser technology does not economically justify using this type of scale removal.

Accordingly, there remains a need for a metal oxide descaling process that does not require the use of an acid which causes an environmental disposal problem. There remains a need for a descaling process wherein an oxidized metal strip traveling at a high speed does not have to be given a shot blasting pre-treatment to loosen the scale to insure complete removal. A laser process is needed that could economically remove the scale layer. To achieve this the laser must have a large average power so that it can remove the oxide at line speeds that are comparable to that achieved with conventional acid pickling without requiring the use of an acid and/or shot blasting to assist in the removal of metal oxide from the metal strip. Another need is for the laser to be efficient in the removal of the oxide so that a minimum number of laser photons are required. To achieve this, the laser must have a very short pulse width, have a high repetition rate and have a wavelength that can be selected to give the highest scale removal rate. Another need is for the capital and operating costs of the laser to be reasonable to justify the economics of the process.

BRIEF SUMMARY OF THE INVENTION

A principal object of the invention is to provide a process and apparatus for using laser radiation to remove the surface oxide of a metal with a minimum of input energy per volume of oxide (scale) removed.

Another object of the invention is to provide a descaling process and apparatus capable of completely removing an oxide film from a metal.

Another object is to provide a descaling process and apparatus capable of completely removing an oxide film from a metal strip traveling at a high rate of speed (e.g. greater than 30 m/min).

Still other objects of the invention include providing a descaling process and apparatus that eliminates the need for chemicals, eliminates the need for chemical disposal, eliminates the need for shot blasting of the oxide film and eliminates the need for a large and costly wet acid pickling line.

This invention relates to a process and apparatus of using laser radiation for removing oxide scale from a metal. The process includes utilizing electromagnetic radiation having a very short pulse width, a very high pulse repetition rate and a very high average power. The laser radiation is passed through at least one optical element to focus the radiation into an incident beam having a surface power density of at least about 5 $MW/cm^2$ at the point of contact with the metal surface. The focused radiation beam extends transversely completely across the oxide covered surface of the metal to remove the oxide by vaporization by one or more laser pulses thereby forming an oxide free surface.

Another feature of the invention is for the aforesaid laser radiation having a photon wavelength in the ultraviolet range.

Another feature of the invention is for the aforesaid optical element being a lens, a mirror or a combination thereof.

Another feature of the invention is for the aforesaid optical element being a combination of aligned elements.

Another feature of the invention is for the aforesaid element including means for splitting the radiation beam into a plurality of focused sub-beams, each sub-beam having a power less than that of the raw beam originating from the laser.

Another feature of the invention is for the aforesaid element to include means for homogenization of each sub-beam to provide a relatively uniform spatial power distribution across the focused beam.

Another feature of the invention is for the aforesaid homogenization means to include a step-index optical fiber and a lens for focusing the radiation beam into one end of the fiber.

Another feature of the invention is for the aforesaid homogenization means to include a linear diverging lens having a sharp radius at the apex.

Another feature of the invention is for the aforesaid sub-beam being focused into at least one line extending transversely across the entire width of the metal surface or being focused into a spot with the spot being traversed across the entire width of the metal surface.

Another feature of the invention is for the aforesaid sub-beam to contact the metal surface at an acute angle of 10–75°.

Another feature of the invention includes the additional step of collecting the vaporized oxide into a powder.

Another feature of the invention includes the additional step of protecting the point of metal surface contact and the oxide free surface with a non-oxidizing gas.

Another feature of the invention is for the aforesaid laser pulse width being less than 100 picoseconds.

Another feature of the invention is for the aforesaid laser pulse repetition rate being at least 1 kHz.

Another feature of the invention is for the aforesaid laser average power being at least 1 kW.

Another feature of the invention is for the aforesaid metal being a hot rolled or annealed strip traveling at a speed consistent with a laser beam pulse repetition rate.

Another feature of the invention is for the aforesaid metal being a strip traveling at a speed of at least 1 m/min.

The apparatus includes a laser capable of producing electromagnetic radiation having a very short pulse width, a very high pulse repetition rate and a surface power beam density of at least about 5 $MW/cm^2$, at least one optical element for focusing the radiation into an incident beam and a sealed interaction chamber for treating an oxide covered traveling metal strip with the chamber containing a non-oxidizing gas for removing oxide debris and for protecting the as-cleaned strip surface. The chamber also includes a slotted entry for receiving the oxide covered strip, a slotted exit for a passage of a cleaned strip, at least one elongated window for receiving the radiation beam into the chamber and means for removing vaporized oxide from the chamber.

Another feature of the invention is for the aforesaid laser radiation having a photon wavelength in the ultraviolet range.

Another feature of the invention is for the aforesaid chamber to include an exhaust duct for removing non-oxidizing gas ladened with vaporized oxide debris from the chamber, a filter for removing the debris as a powder from the gas and a return duct for returning the cleaned gas to the chamber.

Another feature of the invention is for the aforesaid chamber to include a blower for returning the cleaned gas through the return duct.

Another feature of the invention is for the aforesaid chamber to include a nozzle for directing the gas into the chamber.

Another feature of the invention is for the aforesaid optical element to include at least one of a lens, a mirror or a combination thereof.

Another feature of the invention is for the aforesaid optical element being a plurality of aligned elements.

Another feature of the invention is for the aforesaid optical element to include means for splitting the radiation beam into a plurality of focused sub-beams and the chamber including a corresponding number of windows, each window for receiving one of the sub-beams of the radiation.

Another feature of the invention is for the aforesaid optical element to include means for homogenization of the radiation to provide a relatively uniform spatial power distribution across the focused beam.

Another feature of the invention is for the aforesaid optical element to include homogenization means having a linear diverging lens with a sharp radius at an apex.

Another feature of the invention is for the aforesaid optical element to include homogenization means having a lens and a step-index optical fiber, the lens for focusing the radiation beam into one end of the fiber.

Another feature of the invention is for the aforesaid radiation beam being focused into a line.

A major advantage of the invention includes elimination of wet acid pickling for removing scale from metal. Another advantage of the invention is to provide a descaling process that vaporizes oxide so that the oxide debris can be easily collected for disposal. Other advantages include a laser scale removal process faster than other known laser removal methods because of the combination of high average laser power, high pulse repetition rate, very short pulse width and the ability to choose an optimum laser wavelength. All of these laser properties can be obtained from a high average power free electron laser.

The above and other objects, features and advantages of the invention will become apparent upon consideration of the detailed description and appended drawings.

BRIEF DESCRIPTION OF THE DRAWINGS

FIG. 4B shows a graphical representation of the intensity distribution of the radiation of FIG. 4A along the length of the projected line.

DETAILED DESCRIPTION OF THE PREFERRED EMBODIMENT

Figure 1:
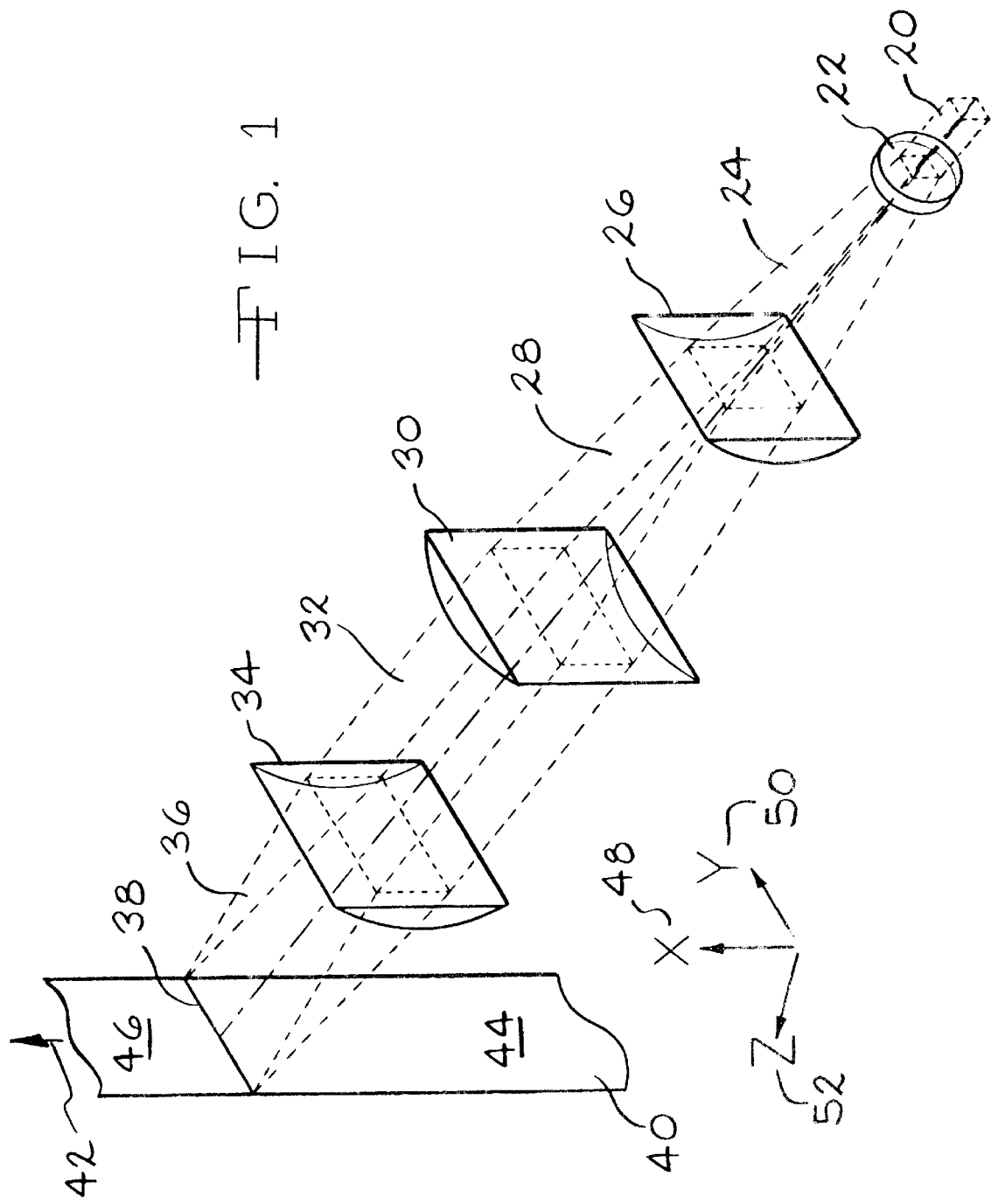
FIG. 1 is a perspective view of an optical system for providing a focused line for descaling metal strip of the invention.

The process of the invention relates to using a laser for removing oxide, e.g., scale, from a metal such as steel strip. The process includes utilizing electromagnetic radiation having a very short pulse width, a very high pulse repetition rate and a high average power and passing the radiation beam through a series of aligned optical elements such as cylindrical lenses, mirrors or a combination thereof to focus the beam into a spot projected transversely completely across a traveling metal strip. Alternatively, the radiation may first be passed through means for homogenization to form a radiation beam having uniform intensity. Thereafter, the homogenized beam may then be passed through the aligned optical elements to focus the beam into a straight line projected transversely completely across a traveling metal strip. A surface area power density at the point of incident contact by the laser radiation with the oxide covered strip surface is at least 5 MW/cm$^2$. Depending on the average power of the laser beam, the beam may be split into a series of lower power sub-beams each of which is focused into a line or spot whose length/diameter is less than the full strip width. However, there would be a sufficient number of beam splitters and cylindrical focusing optics or spot scanning optics so that the complete strip width would be covered by this series of transversely contiguous focused sub-beams so that the oxide covered surface along this cross width section of the strip is completely descaled by vaporizing molecular layers of the oxide during each radiation pulse. Each division of a radiation beam into a sub-beam reduces the power of the original main beam by the inverse of the number of sub-beams.

A sealed apparatus removes the vaporized oxide debris so that particles do not resettle onto the clean descaled surface. The apparatus contains a non-oxidizing protective gas, e.g., helium or argon, blown across the focused beam reaction zone or beam surface contact to carry away the vaporized metal oxide particles. There is also a vacuum exhaust duct from the descale chamber that withdraws the inert gas carrying the vaporized debris through a filter where the debris is deposited as a powder for eventual removal. The inert gas can then be recirculated to the chamber. The angle of incidence of the impinging focused laser beam preferably is not perpendicular to the strip surface, but at some acute angle to lessen the interaction and possible absorption of the incoming laser radiation with the beam plume created by the vaporized debris.

The removal of the complete depth of the oxide layer is achieved by delivering many pulses of the laser radiation at the same focused beam location. Each pulse vaporizes a molecular oxide layer until the base metal layer is reached. This is controlled by the dwell time of the beam at each location as determined by the pulse repetition rate and the line speed of the strip surface moving through to the length of the focused laser beam. Depth of oxide removed can also be controlled by adjusting the overall laser average power through variable attenuators and, for a fixed pulse repetition rate, the energy delivered in each pulse.

The laser of the invention has unique properties enabling metal oxide (scale) removal at an economically attractive rate with a minimal number of lasers. The laser produces electromagnetic radiation having a very short pulse width, e.g., less than 1 nanosecond, a very high pulse repetition rate, e.g., greater than 1 million pulses per second, and high average power, e.g., 1–1000 kW of average power. An example of this type of laser is a free electron laser (FEL). An additional advantage of the free electron laser is that it can be tuned to operate within a broad range of wavelengths in the near UV, visible, and near IR part of the spectrum. Since it is believed that shorter wavelengths, e.g., in the UV part of the spectrum, will be more efficiently absorbed by the scale layer and hence lead to higher descale rates, the free electron laser of the invention will be operated so that the radiation has a photon wavelength in the ultraviolet range. However, it also is believed that the laser can be operated at wavelengths in the visible, near IR, and mid IR regions of the electromagnetic spectrum and also obtain efficient scale removal.

A free electron laser requires an electron beam accelerator to operate. Bunches of electrons are injected into the accelerator. An accepted method is to use a low average power laser such as disclosed by Benson et al in an article entitled *Development of an Accelerator Ready Photo Cathode Drive Laser at CEBAF,* Process Particle Accelerator Conference, 1995, Dallas, Tex., to impact on a target material and thereby release electrons. This photo cathode method generates electron bunches which are then accelerated by various superconducting RF modules to velocities very nearly the speed of light. These relativistic energy electron bunches travel through a "wiggler" section consisting of alternately directed fixed magnetic fields each of which exerts a Lorentz force perpendicular to the direction of travel of the electron bunch. The next magnetic field encountered in the "wiggler" exerts a field that is oppositely directed to the one preceding it so that the electron bunch now feels a Lorentz force perpendicular to the direction of travel but at a direction 180 degrees from the one just encountered. Thus the trajectory of the electron bunch is "wiggled" back and forth along its primary direction of travel through the "wiggler". Since the electron is a charged particle, the transverse accelerations that the electron bunches feel as they pass through the wiggler cause the emission of electromagnetic radiation. This radiation is amplified by mirrors that are appropriately placed in the direction of travel of the electron bunch. This radiation gives rise to the actual laser beam created by the transversely accelerated freely traveling bunches of electrons. For an attractive industrial device, it must be possible to have a continuous production of these bunches so that a high average power from the laser can be achieved. Each bunch of electrons passing through each magnet of the "wiggler" give rise to a pulse of laser radiation. The more electrons in the bunch, the higher the energy per emitted laser pulse; and the more bunches, the higher the pulse repetition rate and, hence, the higher the average laser power. Thus, a key to a high average power laser is a high average electron beam current. This means the laser photocathode should generate as many electrons in each bunch as possible at as high a repetition rate as possible. If this is done on a continuous basis, then a high average power laser with high pulse repetition rate will occur. Although a number of free electron lasers have been built around the world, none produce high average power or are capable of continuous long term operation. A continuous operation 100 kW average FEL will allow laser descaling to be done at economically attractive rates.

The scale layer is removed by vaporizing molecular layers of the oxide with each pulse. By vaporization is meant the laser pulse delivers enough energy to raise the temperature of the oxide to the vaporization temperature while overcoming the heat of fusion and then the heat of vaporization of the oxide. It will be further understood vaporization scale removal may also include removing the oxide by an explosive shock wave, a gaseous release of the bound oxygen to blow the oxide layer free of the metal substrate, or any other mechanism that benefits from the very short pulse width and high peak power produced by this type of laser. A potential advantage of the very short pulse width and high peak power per pulse is that a shock wave mechanism or some other mechanism, e.g., gaseous release of the bound oxygen in the oxide, may permit a higher descale rate than predicted by simple thermal considerations alone.

A FEL of the type used in this invention is being constructed at the Thomas Jefferson National Accelerator Facility (the Jefferson LAB). The laser is described in a Department of Energy Review report entitled *Free Electron Lasers for Industry,* Volume I, May, 1995. The Jefferson LAB is located at Newport News, Va. and is operated for the DOE by the Southeastern Universities Research Association (SURA). Two key features of this laser, unlike any other FEL, is the continuous operation and the high average power. These features are essential to utilize such a laser for any continuous high-speed industrial process such as laser descaling.

For this invention, it will be understood that a very short pulse width is meant a time duration less than 1 nanosecond, preferably at a pulse width less than 100 picoseconds, more preferably less than 10 picoseconds, most preferably less than 6 picoseconds. A pulse width as short as 1 femtosecond may be possible. This very short pulse width is a key feature required to provide efficient scale removal. The ability to vaporize any material with laser radiation is dependent upon delivering a sufficiently high surface area power density, i.e., greater than about 5 million watts/cm$^2$ (5 MW/cm$^2$). The power per pulse is calculated by dividing the pulse energy by the pulse width. The surface area power density per pulse is then determined by dividing the pulse power by the area of the focused laser spot. Thus, the smaller the pulse width, the lower the energy per pulse that is required to achieve sufficient surface power density to cause vaporization. Of course, the amount of material vaporized by each pulse is determined by the total energy in each laser pulse. For example, if there is only 33.3 microjoules of energy in a single pulse from a 1 kW FEL laser operating at a 30 million pulses per second (30 MHz) repetition rate, it might take 1 hundred thousand pulses to remove a 5 micron thick layer of iron oxide over a surface area of 2 cm$^2$. However, because the repetition rate is so high, this 2 cm$^2$ area will be descaled to the 5 micron depth in 1/30th of a second. As the laser average power becomes larger, there will be more energy in each pulse, so that each pulse can now vaporize a larger volume of oxide thereby increasing the overall scale removal rate. If the average laser power is increased to 100 kW, it should be possible to descale a surface area of 200 cm$^2$ to the same 5 micron depth in the same 1/30th of a second.

Another key benefit realized by the very short pulse width is the ability to efficiently remove a layer of oxide with the energy from the pulse before there is sufficient time for a plasma plume to develop that will absorb a significant portion of the incoming laser pulse thereby reducing the rate at which scale can be removed from the surface. The molecular layers of the oxide are removed in a picosecond time frame and then swept away by an inert gas sweep before the next laser pulse arrives to remove the next molecular oxide layers. This allows the full average laser power to be utilized in oxide removal with no lost energy due to the beam interacting with the plasma. This a key advantage over continuous wave (CW) laser operation. The pulse width is in the range from 1 femtosecond to 100 picoseconds.

For this invention, it will be understood by a very high pulse repetition rate is meant a rate of at least 1 kHz with about 1 MHz (one million pulses per second) being desirable. Preferably, a pulse frequency greater than 10 MHz is recommended because the energy per pulse will be limited by the number of electrons in each bunch passing through the wiggler of the free electron laser. More preferably, the pulse repetition rate is at least 30 MHz and most preferably at least 40 MHz and up to 1 GHz (1 billion pulses per second) could possibly be used. A high average power in the laser beam is desired because this determines the descale rate. Calculations show approximately 100 kW of laser beam power is required to descale at an economical rate. Thus, the pulse repetition rate multiplied by the energy per pulse is equal to the average power of the laser beam. For example, if the energy per pulse is 3.33 millijoules (0.00333 joules), then the pulse repetition rate should be 30 MHz so that the total beam power is 100 kW. If the energy per pulse can be increased to 3.33 joules by injecting a much larger number of electrons into each bunch circulating in the electron accelerator, then the pulse repetition rate can be dropped to 30 kHz and still obtain an overall average beam power of 100 kW.

For this invention, it will be understood that by high power is meant an average power of at least 1 kW. Preferably, the power is greater than 1 kW, more preferably at least 10 kW and most preferably at least 100 kW. A power of 100 kW is desired to make the laser removal of the oxide layer an attractive economical process. Although lower average laser power will also remove the oxide layer, it results in a slow removal rate requiring a large number of lasers to obtain a high removal rate.

For this invention, it will be understood by metal is meant any metal that can become oxidized during hot processing such as hot forging, hot rolling, annealing and the like. Such metals may include ferrous based materials such as low carbon steel, medium and high carbon steel, nickel alloyed steel, chromium alloyed steel, stainless steel, electrical steel and non-ferrous metals such as nickel, aluminum, copper, .titanium and alloys thereof. The metal may be a casting or in a wrought condition such as continuous strip, sheet, foil, bar, billet, slab, wire, castings and the like. For ferrous metals, the metal oxide or scale will be predominately iron oxide.

Referring to FIG. 1, reference numeral 20 denotes electromagnetic pulsed radiation incident upon one or more optical elements such as a first divergent spherical lens 22. Although pulsed radiation 20 is illustrated as being square in cross-section, it will understood this raw unfocused beam may have other cross-sectional shapes such as rectangle, a round, ellipse, and the like. As will be discussed in more depth below, it is important that radiation beam 20 have a uniform intensity distribution across the spatial extent of the beam. A divergent electromagnet radiation beam 24 then is passed through a first cylindrical lens 26 for collimating beam 24 into a collimated beam 28 in a vertical x-direction 48. Vertically collimated beam 28 then passes through a second cylindrical lens 30 for collimating beam in a horizontal y-direction 50 into a beam 32. Beam 32 is now collimated in both the horizontal and vertical directions by the anamorphic upcollimator created by the combination of lenses 22, 26, and 30. By judicious choice of focal lengths and spacings of these three lenses, it is possible to independently adjust the horizontal size and degree of horizontal collimation and the vertical size and degree of vertical collimation of beam 32 exiting element 30. Beam 32 then passes through a third cylindrical lens 34 for focusing beam 32 into an incident beam 36 focused as a straight line 38 projected transversely completely across a dirty and oxide covered surface 44 of a metal strip 40 having a direction of travel as indicated by an arrow 42. Incident beam 36 cleans strip surface 44 forming an oxide free surface 46. The length of transversely focused line 38 can have any desired value being limited by the physical transverse length of aligned optical elements 30 and 34 and the choice of the focal lengths and spacing of aligned optical elements 22, 26, and 30. Preferably, strip 40 travels in a gravitationally vertical direction.

FIG. 1 illustrates scale being removed from only one side of strip 40. Normally, a metal strip will have scale on the other side as well with both sides needing to be cleaned. It will be understood one side of the strip can be cleaned with a laser optical system such as illustrated in FIG. 1, the strip could be wound into a coil and then the coil could be passed again through the cleaning system to clean the other side of the strip. Alternatively, two laser optical systems such as illustrated in FIG. 1 could be positioned to clean both sides of the strip simultaneously with the radiation of one system incident upon one surface of the strip and the radiation of the other system incident upon the other surface of the strip.

Figure 2:
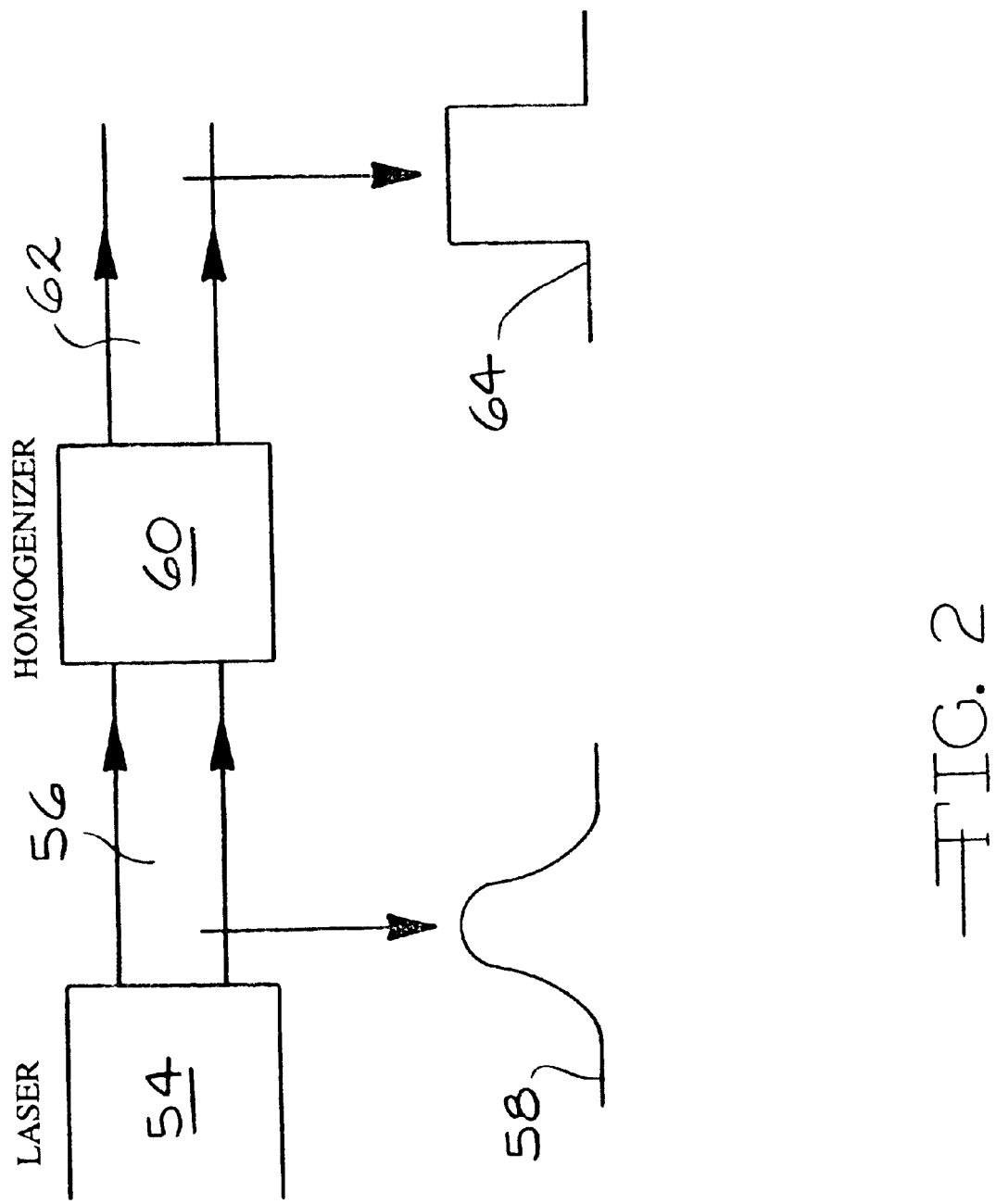
FIG. 2 is a schematic view of a generic beam homogenizer of the invention.

Another important feature of the invention is that the length of the focused laser line has a uniform intensity distribution across its length. This will insure all the oxide thickness is removed uniformly along the length of the focused line. There are a number of methods that can be used to achieve this uniform removal depending on what type of optical system is used. A generic beam homogenizer is shown in FIG. 2. A full power laser beam 56 may have a Gaussian distribution 58 ($TEM_{00}$), donut mode ($TEM_{01}$), or some higher order mode spatial power distribution. The function of a beam homogenizer 60 is to transform beam 56 into a beam 62 having a uniform energy intensity distribution across the spatial extent of the beam. This is a square or top hat distribution 64. One way to achieve this is to focus the beam into a step-index optical fiber.

Figure 3:
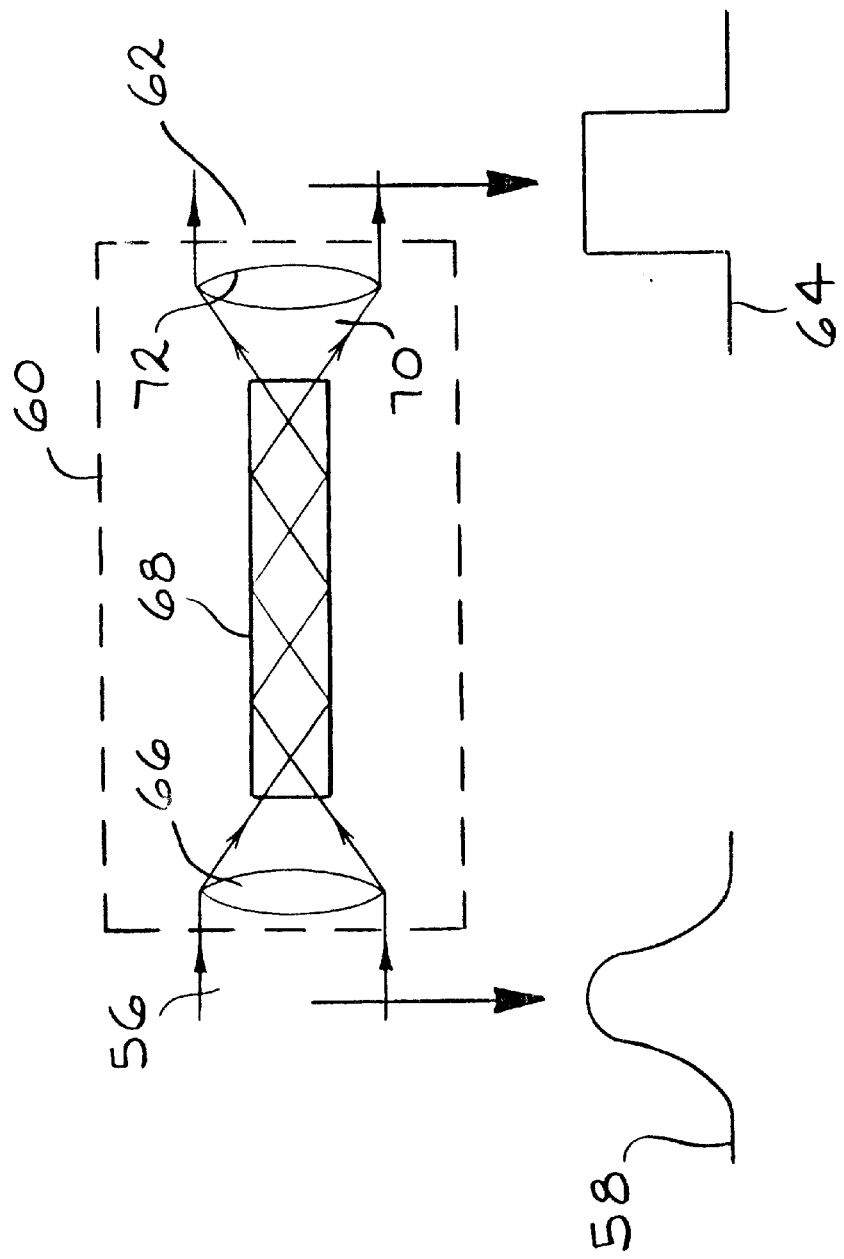
FIG. 3 is a schematic view of a step index fiber used in the beam homogenizer of FIG. 2.

FIG. 3 illustrates a raw collimated beam 56 from a laser 54 is focused by a lens 66 into the end of a step-index optical fiber 68. The multiple internal reflections which occur as the beam propagates along the length of the fiber overlap each other resulting in a uniform spatial power distribution 70 corning out of the fiber. At the exit of the fiber, another lens 72 is placed to re-collimate the beam. If free electron raw laser beam 56 is split by beam splitters into sub-beams of reasonable power, e.g., no more than 10 kW each, then each sub-beam could be focused into a fiber to achieve the uniform spatial power distribution. However, the free electron laser can be tuned over a fairly large wavelength range. A reasonably priced fiber with low attenuation is only practical if the laser wavelength is in the near UV, visible, and near IR part of the spectrum 16. Preferably, the radiation has a photon wavelength in the ultraviolet range.

Figure 4A:
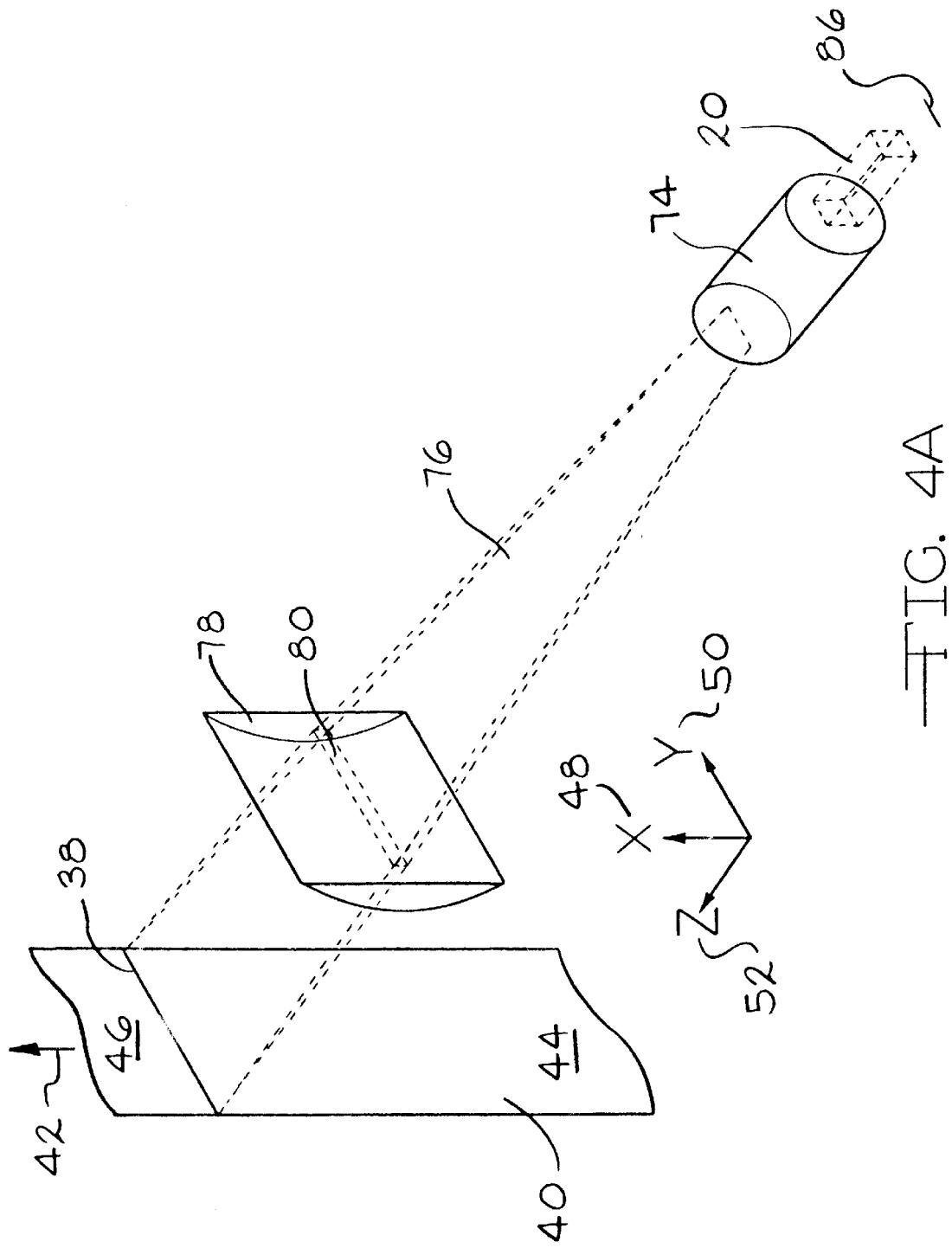
FIG. 4A is a perspective view of an optical system of the invention for focusing radiation into a line having a uniform intensity.
Figure 10A:
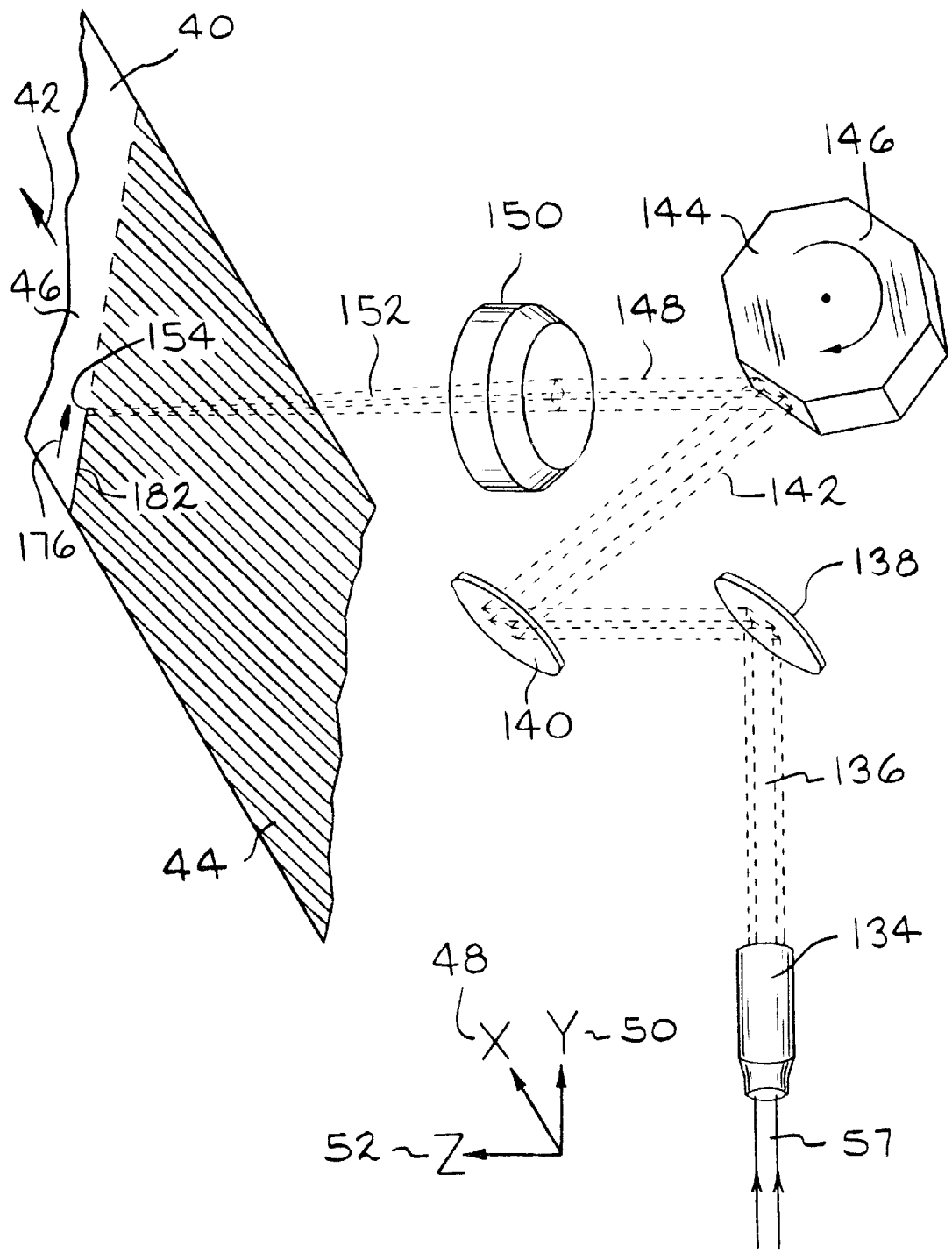
FIG. 10A is a perspective view of another embodiment of a laser descaling optical system of the invention illustrating a refractive flat field lens raster scanning system for focusing laser radiation into a spot to remove the scale from metal strip.
Figure 10B:
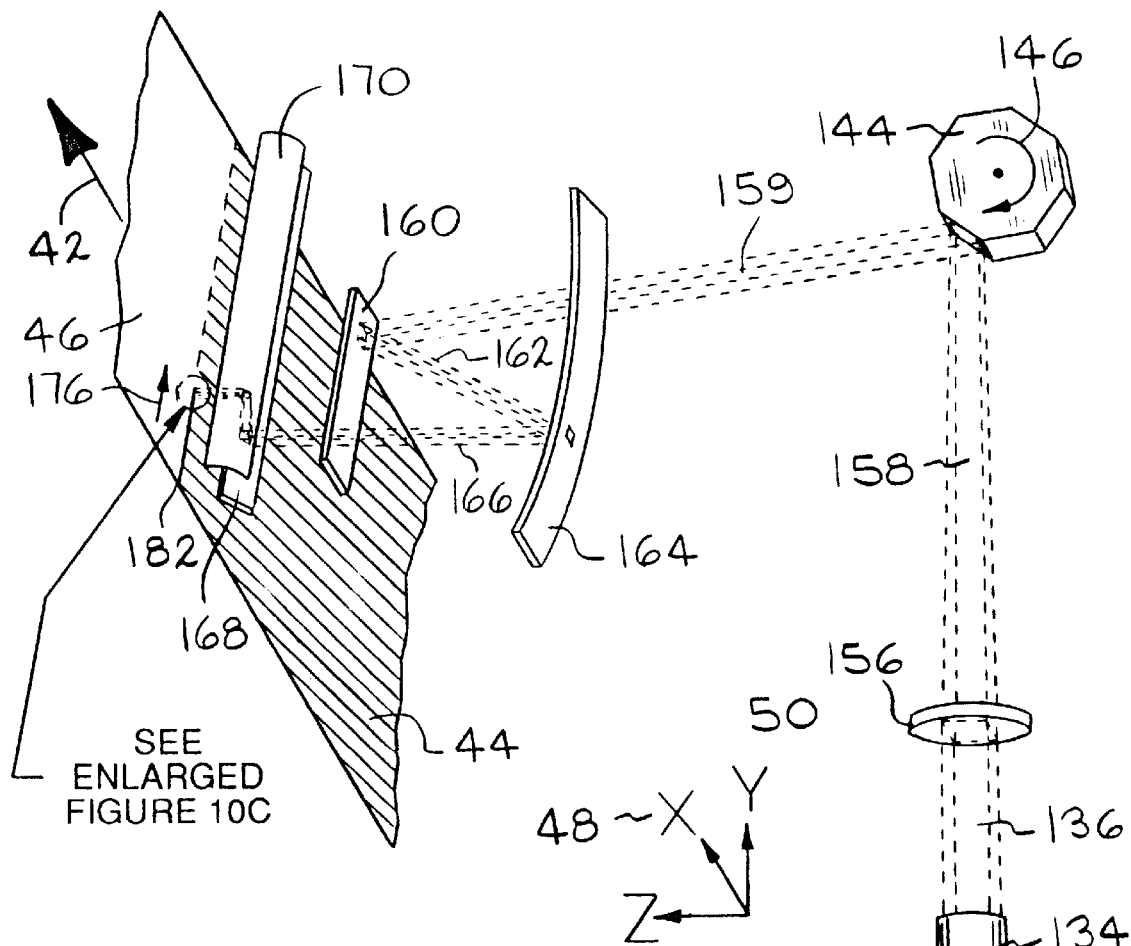
FIG. 10B is a perspective view of still another embodiment of a laser descaling optical system of the invention illustrating a telecentric reflective mirror raster scanning system for focusing laser radiation into a spot to remove the scale from metal strip.

A preferred method of homogenizing a laser radiation beam utilizing a line projection is illustrated in FIG. 4A. This optical system uses a specially designed linear diverging lens 74 that has the appearance of a prism with a relatively sharp radius at the apex. Such a lens is disclosed in U.S. Pat. No. 4,826,299, incorporated herein by reference. It expands the laser beam 20 in one direction only so that a wedge of laser radiation 76 is formed which has a uniform intensity distribution along its transverse or y-direction 50. Line length 86 increases linearly in the y-direction as the radiation diverges away from the lens in a z-direction 52. An intensity distribution 82 along the line length is not perfectly uniform but has some variation 84 as illustrated in FIG. 4B. An additional plano-convex cylindrical lens 78 is illuminated by the projected laser line 80 so that the laser beam is sharply focused into line 38 on the surface of the oxide layer to be removed. The design of diverging lens 74 must include the incident diameter of the laser beam. The line projector lens must be made from the appropriate material based on the wavelength of the laser radiation that will pass through it. This is to avoid absorption of the laser radiation as it is refracted by the projector lens. For example, if the free electron laser wavelength was tuned to be at 1 micron in the near infrared part of the spectrum, then fused silica or BK7 can be used to construct the laser line projector. This material must also be anti-reflection coated for the laser wavelength. If the laser wavelength were in the range of 2–7 microns in the mid-infrared, then calcium fluoride, magnesium fluoride, zinc sulfide, or zinc selenide might be used for the laser line projector lens. Final focusing lens 78 will also be made from the same material and anti reflection coated to minimize absorptive and reflective laser losses respectively. The width of the focused laser line is controlled by the focal length of this final cylindrical lens 78. The length of the laser line is determined by how far the line projector lens 74 is from the final oxide covered metal surface. Final cylindrical focusing lens 78 can be replaced by a combination of a long rectangular flat mirror 168 for redirecting the line of laser radiation and a final cylindrical concave focusing mirror 170 such as shown in FIG. 10B.

Figure 5:
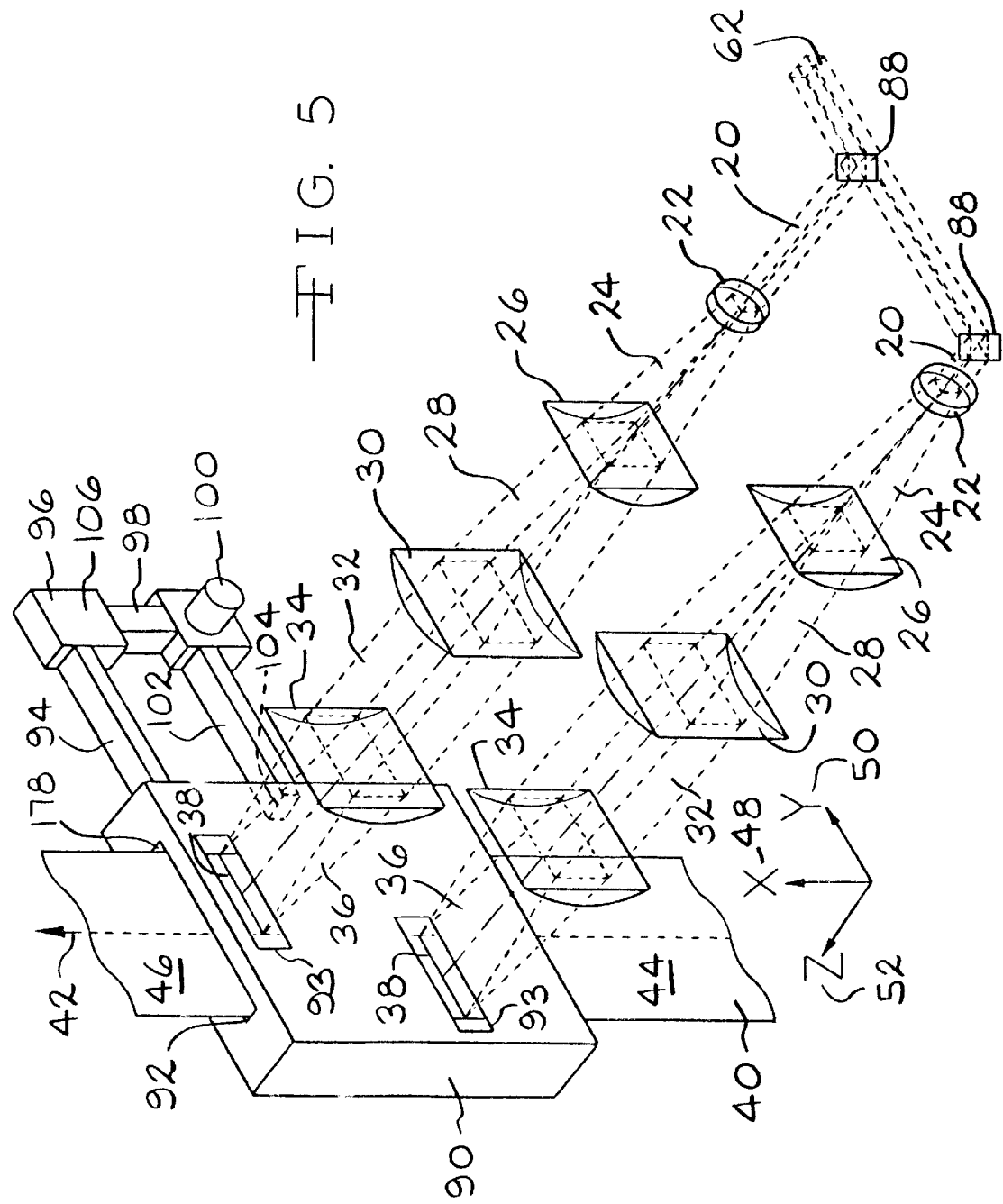
FIG. 5 is a perspective view of another embodiment of the invention illustrating a laser system for descaling metal strip.

By the refractive lens method the full power, e.g., 100 kW, of a laser beam can be split into a plurality of sub-beams. FIG. 5 illustrates a pair of sub-beams covering the full width of metal strip 40 with each beam covering one-half of the strip width. It will be understood this concept can be extended to include any number of sub-beams. For example, if the beam is divided into ten sub-beams, each sub-beam would descale one-tenth the width of the metal strip. The embodiment of FIG. 5 includes a sealed interaction chamber 90 having a sealed entry for receiving strip 40, a sealed exit 92 and a pair of sealed windows 93 which allow beams 36 to pass into the chamber. Chamber 90 also includes an exhaust duct 94 for carrying removed scale debris to a filter unit 96, a delivery duct 98, a blower 100 for circulating a non-oxidizing gas through a gas return duct 102 into a return vent 104 within chamber 90. The gas is recirculated by blower 100 to pick up the scale debris which is deposited in a filter and returned to chamber 90. Each sub-beam 20 will be passed through one of the anamorphic upcollimators (lenses 22, 26, 30) described above in FIG. 1 or by mirrors described in detail in FIG. 9 and then focused by cylindrical lens 34 (or a concave mirror).

Figure 6:
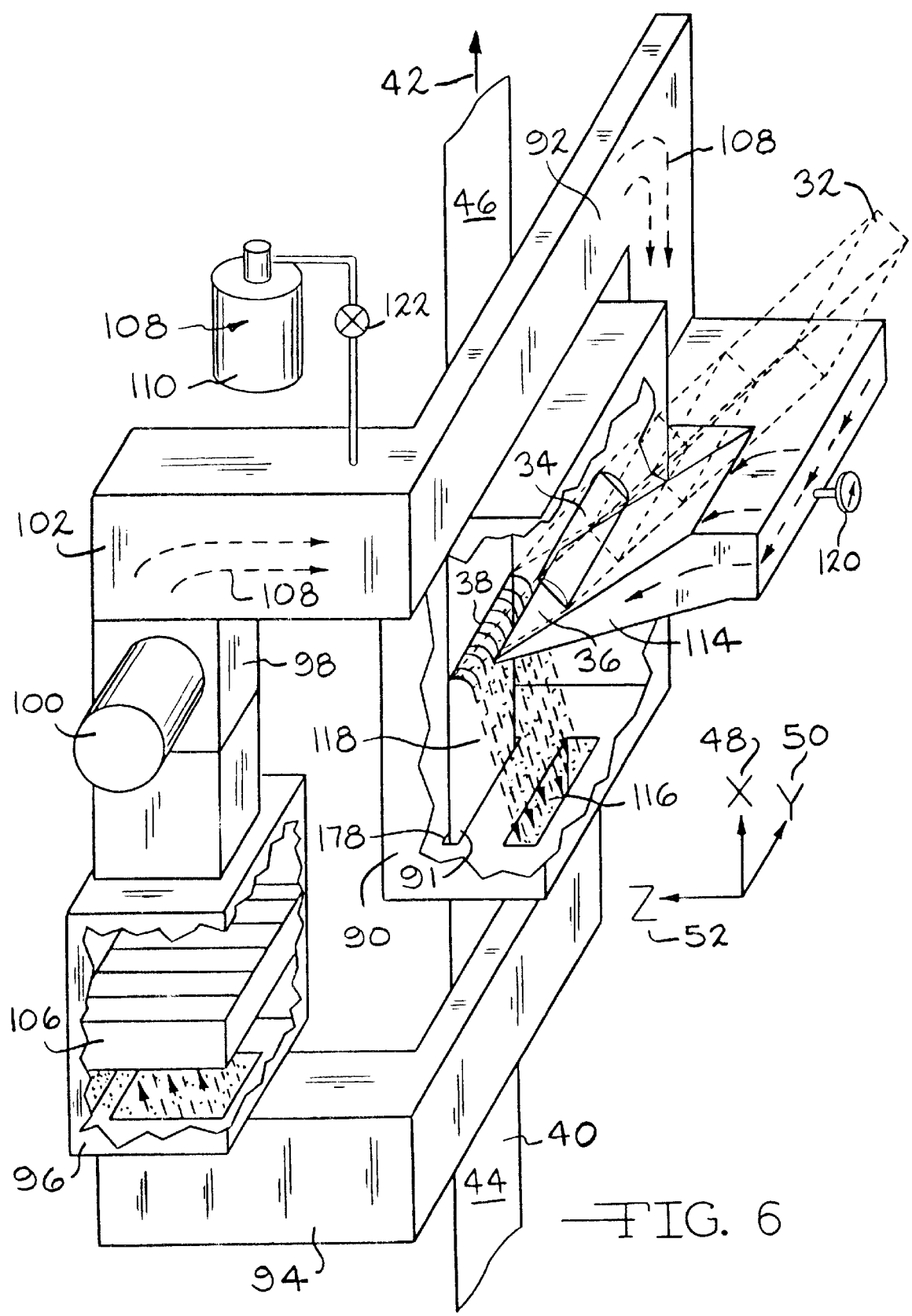
FIG. 6 is a detailed perspective view of a vaporized scale removal chamber of the invention.
Figure 7:
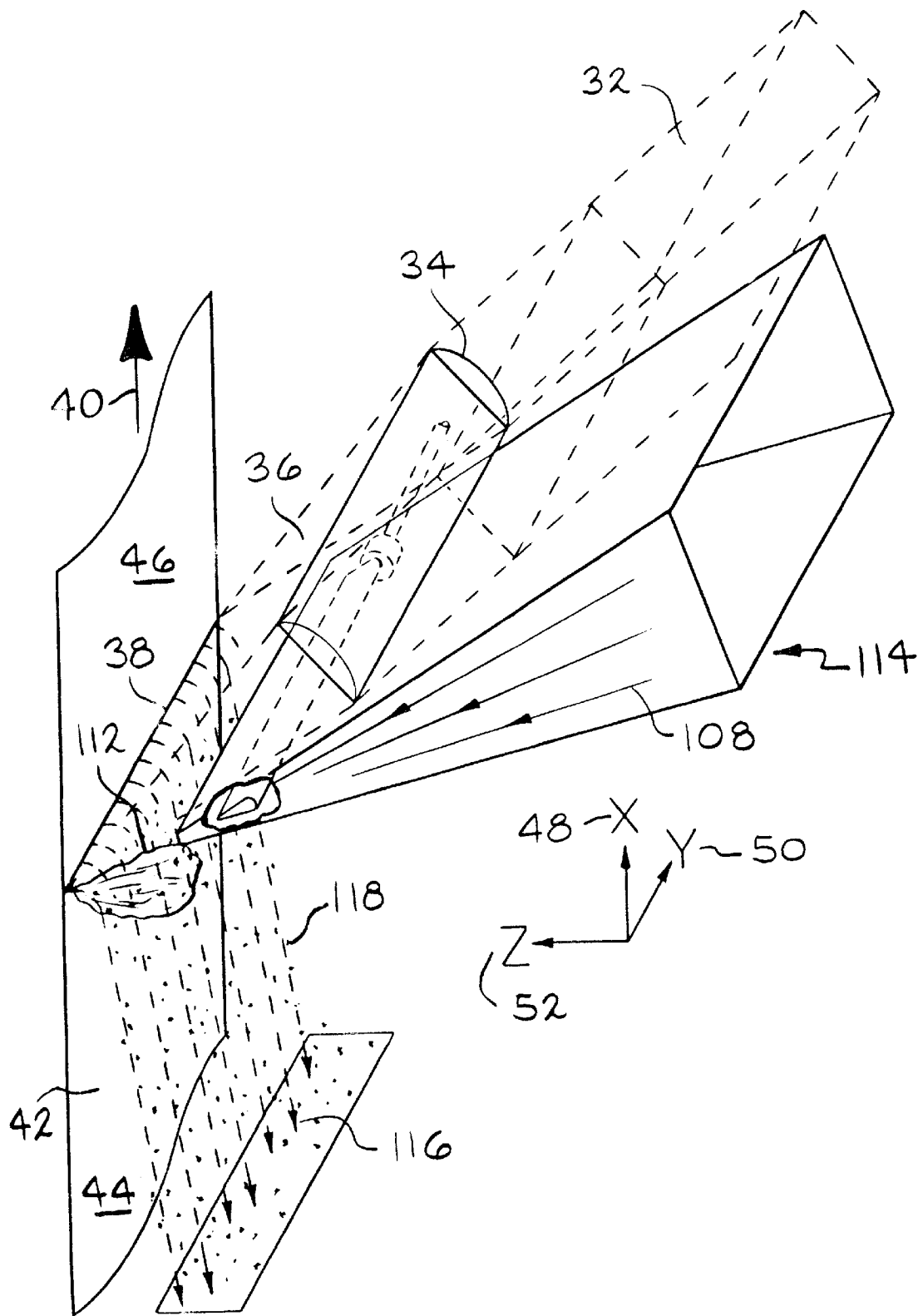
FIG. 7 is a perspective view of the detailed area around the beam reaction zone of FIG. 6 illustrating vaporized scale debris being swept away by an inert gas.
Figure 8:
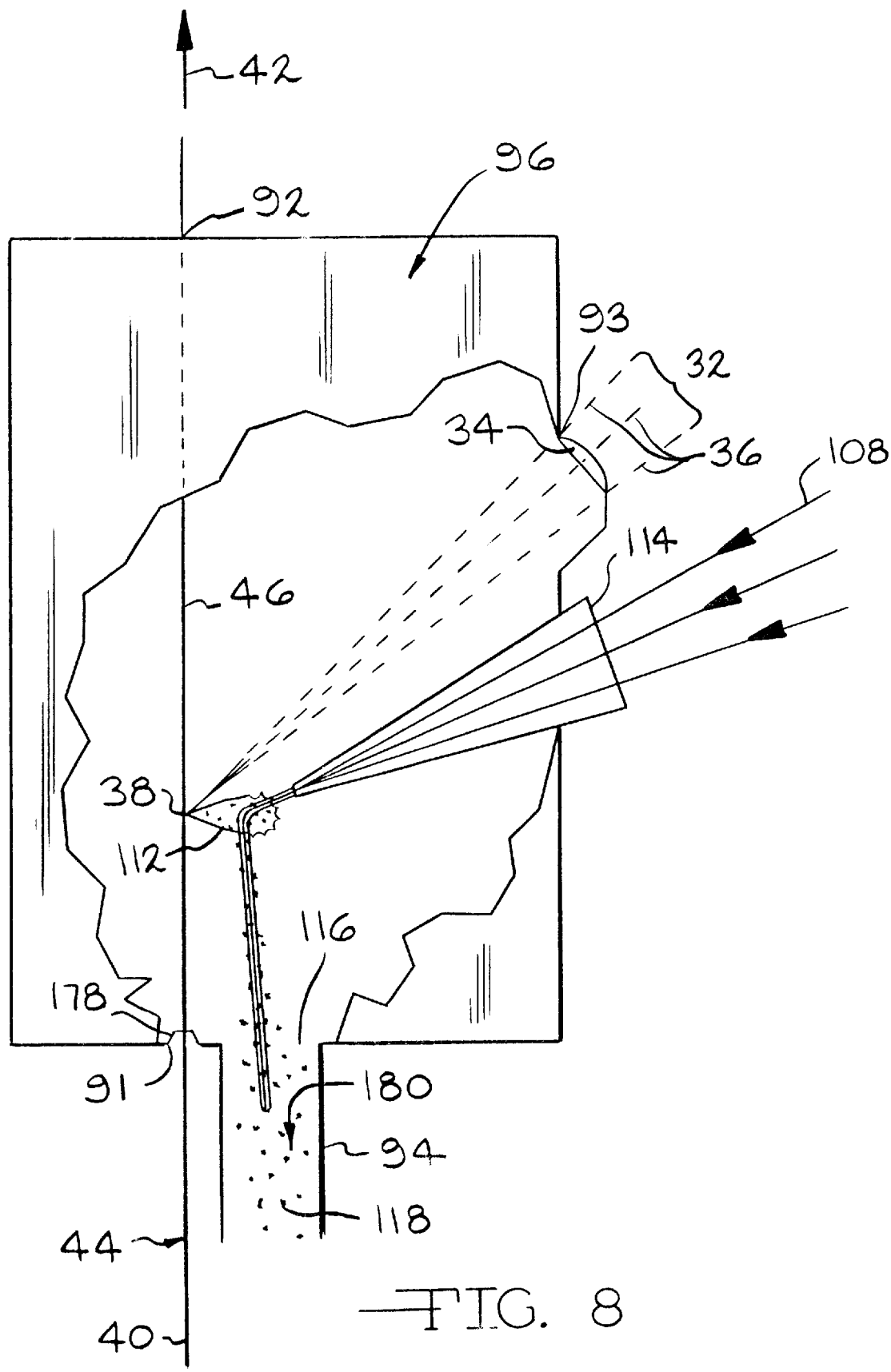
FIG. 8 is a side view of the reaction zone of FIG. 6.

FIGS. 6–8 illustrate more detailed views of a reaction zone at and adjacent to the point of incidence of laser beam 36 and metal surface 44 within chamber 90. Chamber 90 contains a non-oxidizing gas 108, such as helium or argon, supplied from a reservoir 110. This inert gas medium is used to protect the reaction zone and to transport vaporized oxide particles 118 away from the interaction chamber. Incident beam 36 is shown as a converging rectangular wave front focused onto moving metal strip surface 44. Preferably, beam 36 is incident at some non-perpendicular, i.e., acute, angle onto strip surface 44. By acute, it will be understood to mean a preferred angle in the range of 10–75° as measured from the normal to the metal surface. A more preferred range is 25–60° and a most preferred angle is 30°. It is known that a plasma plume 112 created by the vaporized debris has its highest intensity in a direction perpendicular to the strip surface. By orienting the direction of the incident focused radiation away from a direction normal to the surface, it is believed that there will be less absorption of incoming incident beam 36 by created plasma 112. This will yield a higher efficiency in removing the oxide layer. Above plume 112 and just beyond the focusing rectangular wave front of beam 36 is mounted a long slot-like gas nozzle 114 for directing inert gas 108 onto created plasma 112. An important feature of this invention is to surround the plasma created plume as well as clean metal surface 46 with the non-oxidizing atmosphere to prevent reoxidation of cleaned metal surface 46. By maintaining sufficient pressure of the non-oxidizing gas around the plume and the cleaned metal surface and by keeping the chamber sealed from the ambient, the ambient atmosphere, i.e., oxygen, can be kept away from the laser interaction zone immediately adjacent to the plasma plume. Nozzle 114 extends the full length of focused line 38. An exhaust vent 116 in duct 94 is placed on the side of the chamber opposite from where incident beam 36 enters and withdraws the inert gas ladened with debris oxide particles 118 into exhaust duct 94. Duct 94 and gas nozzle 114 preferably are mounted on the entrance side of the chamber, i.e., adjacent the dirty strip surface 44. This minimizes the amount of debris that might otherwise settle back onto the cleaned metal strip from recontaminating freshly descaled surface 46. Instead, debris particles 118 would fall onto untreated surface 44 and pass back into incident beam 36 where it will be vaporized again. Debris oxide (scale) particles 118 are drawn toward the entry side of the chamber as indicated by the direction of arrow 180 to be deposited into a filter 106 positioned within filter unit 96 that removes the micron size debris particles. This would be especially true if strip 40 is traveling in a vertical direction so that gravity will tend to cause debris particles to fall away from the strip toward exhaust vent 116. Filter unit 96 may also include a vibratory mechanism so that the debris particles can be deposited in a collection container (not shown) located below the filter. Inert gas 108 is drawn through filter 106 and recirculated by blower 100 and re-enters vacuum chamber 90 through nozzle 114 to pick up more debris 118. Gas reservoir 110 periodically injects fresh inert gas 108 into return duct 102 to replenish any lost gas. A pressure gauge 120 in the nozzle monitors gas pressure and is used to control a solenoid valve 122 on the gas reservoir. It shows the flow pattern of inert gas 108 and debris particles 118 that are picked up by this flow and how the particles are transported to exhaust vent 116. The same nozzle and exhaust system can be used with the scanned focused spot system such as described in FIG. 10A & 10B. In this case, the focused line is now the scan field width that the focused spot is scanned across.

Another important feature of the invention is illustrated in FIG. 8. FIG. 8 illustrates the importance of preventing ambient atmosphere from entering into chamber 90. In addition to maintaining a protective atmosphere 108 within chamber 90, it is also important to properly seal the chamber. For example, although cylindrical lens 34 could be positioned outside or inside chamber 90, preferably lens 34 is mounted within window 93 thereby forming a seal. An entry 91 (FIG. 6) for receiving strip 40 and exit 92 both preferably are sealed with a flexible material 178 such as polypropylene. By orienting gas nozzle 114 toward metal surface 44 at an angle with a gas velocity component toward exhaust vent 116, the inert gas ladened with debris oxide particles 118 is directed toward exhaust duct 94. Positioning duct 94 and gas nozzle 114 on the entrance side of the chamber above dirty strip surface 44 will prevent any debris that might otherwise settle back onto the cleaned metal strip from recontaminating freshly descaled surface 46.

The width of focused 38 line in the metal movement direction 42 will be determined by the focal length of final focusing lens 34, the degree of upcollimation achieved, and by the divergence of beam 20 incident on first lens 22 of the anamorphic upcollimator. It would be possible to control this width of focused line 38 over the range from approximately 0.1 mm to many centimeters. The actual value will depend on the length of the focused line and the energy per pulse. For example, if a 100 kW raw beam 14 from laser 54 is split into 10 sub-beams of 10 kW each and it is desired to descale a 1 meter wide metal strip, then each of the 10 focused lines will be 10 cm long and will be focused to a width of approximately 2 mm for each. If the laser is operating at a 30 MHz repetition rate and a 2 picosecond pulse width, each pulse in each of the 10 kW sub-beams will have an energy of 333 microjoules and will have a focused surface power density of approximately 83 MW/cm$^2$. An important feature of this invention is that the surface power density (watts/cm$^2$) be sufficiently high to cause vaporization of the oxide on the metal strip. This requirement is fundamental for this invention in determining the length and width of the focused line so that the laser energy per unit time per pulse delivered over this line meets this criterion of giving rise to a surface power density of at least 5 MW/cm$^2$.

Figure 9:
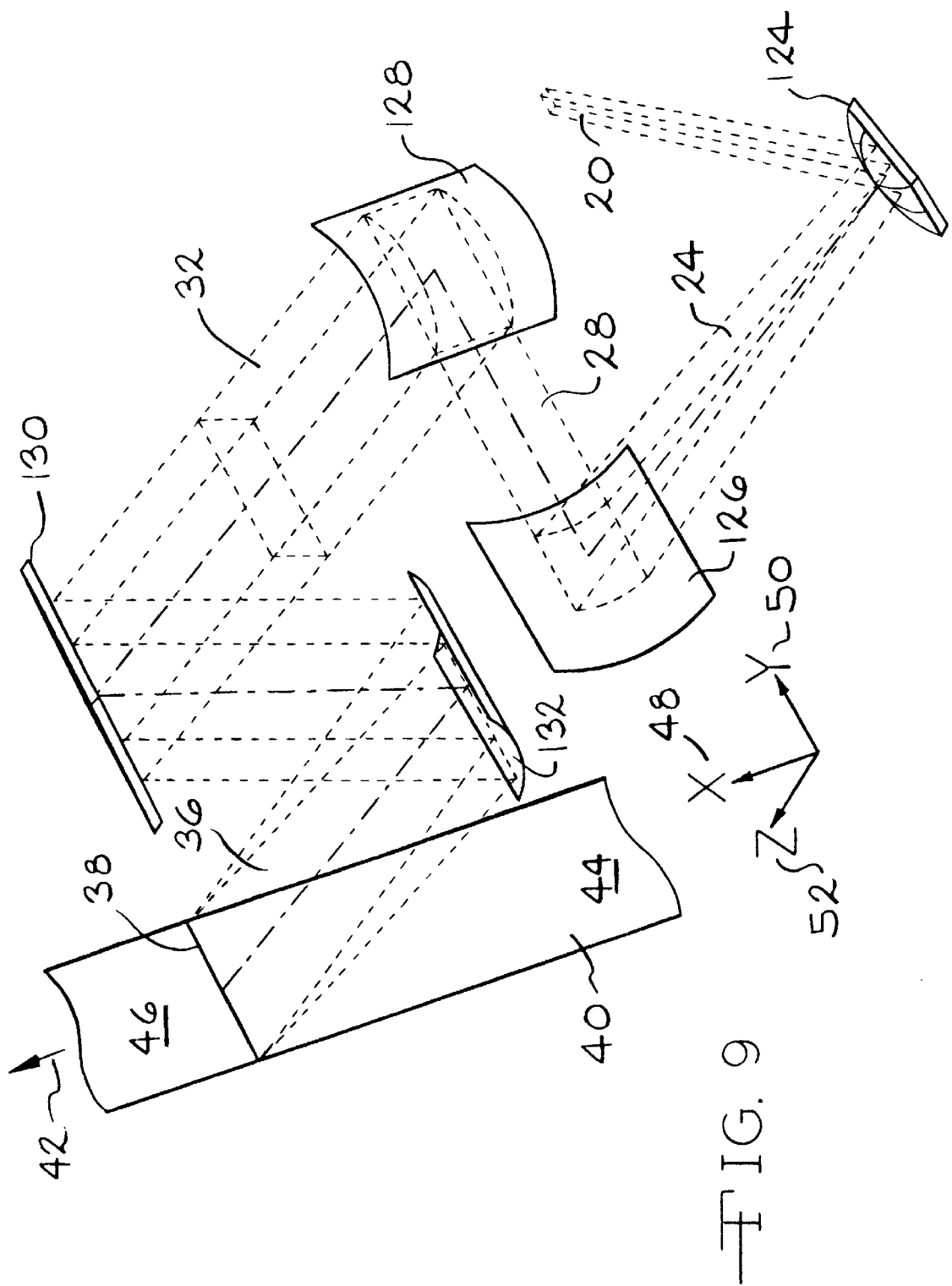
FIG. 9 is a perspective view of another embodiment of the invention illustrating a mirror optical system for focusing radiation into a line for descaling metal strip of the invention.

With these considerations in mind, the length of the focused line transverse to the direction of metal travel direction 42 can be as small as 1 mm to as wide as 2 m, and the focused line width can be from 0.1 mm to 10 cm so long as the above surface power density constraints are maintained. For example, with a reflective mode system such as shown in FIG. 9 the length of the laser line with a 100 kW average power laser beam would be 1 m extending completely across the full width of the metal strip and the width of focused line 38 being 2 mm. With a pulse energy of 3.33 millijoules and a 2 picosecond pulse width this gives the same surface power density per pulse of 83 MW/cm$^2$ mentioned above that is obtained for each of the 10 cm long sections that is focused by a refractive lens system. So the same full metal surface descale capability can be obtained by a single optical system focusing the entire 100 kW, or 10 subsystems each focusing 10 kW, or even 100 subsystems each focusing 1 kW. The details as to which optical system is used depends upon other issues such as the comparative cost and availability of the optical components.

The oxide film will become vaporized and removed from the entire surface area of the metal strip forming clean metal surface 46 substantially free of any oxide without any other mechanical or chemical assistance. For example, a pre-treatment such as shot blasting or roller leveling to crack or loosen the scale would not be required prior to the laser treatment and little, if any, cursory post-treatment such as an immersion acid pickling would be necessary for dissolving any remaining amounts of the scale after the laser treatment. The descaling process of this invention would have significant environmental advantages because disposal of toxic pickle liquors would no longer be required.

Metal strip surface 44 moves under focused line 38 at a rate of speed that is consistent with the pulse repetition rate and pulse energy needed to remove the oxide thickness completely to the base metal. Since the metal strip is moving continuously in a vertical direction at line speeds of at least 10 m/min, preferably at least 30 m/min and possibly as much as a few hundred meters per minute, the high pulse repetition rate, e.g., 30 MHz, means multiple pulses will strike the same location. This is necessary since one pulse alone does not contain enough energy to completely remove the scale layer. Each pulse removes some number of molecular layers so that a large number of pulses at the same location is required to completely remove the scale layer down to the base metal.

Although it is possible to make the lens (or mirror) optical combination large enough to cover the width of the widest metal strip, e.g., about two meters, likely to require descaling, there are additional considerations suggesting multiple combinations of lenses or mirrors may be a better method. With a mirror optical system, it is possible to cover about a 1 m wide section with a single set of mirrors. A mirror optical element typically is able to accept a higher power density on the reflecting surface than a refractive element. Refractive elements have some degree of radiation absorption causing heating to an elevated temperature. When the average power is higher than 10 kW, heating of the optical element can be a significant effect depending on the beam diameter. Dimensionally large refractive elements also are more expensive than their reflective counterparts, especially if the wavelength chosen requires a more expensive refractive material, e.g., zinc selenide. It will be understood the invention also can utilize a combination of flat, convex, and concave mirrors to focus the laser radiation into a transverse line.

FIG. 9 illustrates another embodiment of the invention using a combination of convex, flat, and concave mirrors used to focus the laser radiation into a line. Incident raw laser beam 20 strikes the surface of a convex mirror 124 that diverges the beam in both x-direction 48 and y-direction 50 into divergent beam 24. Divergent beam 24 then is intercepted by a cylindrical concave mirror 126 which acts to collimate the beam in the x-direction into collimated beam 28. Now beam 28 continues to expand in the y-direction until it strikes a cylindrical concave mirror 128 which acts to collimate the beam in the y-direction into beam 32. Collimated beam 32 now has a rectangular shape whose cross sectional dimensions are controlled by the focal lengths and spacings of mirrors 124, 126, and 128. The length in the y-direction of this rectangular cross section is determined by the desired width of metal strip 40 treated by this optical system. If there are to be multiple optical systems to cover the full width of the strip surface, then the length of the optical system will only be a fraction of the full width. Beam 32 is then reflected by a rectangular flat mirror 130 to a long final focusing cylindrical concave mirror 132 having the same length as the desired final focused line 38.

A scanning focused spot optical beam delivery method can also be used to remove the oxide layer (scale). A refractive based optical system for this embodiment is illustrated in FIG. 10A. Full power laser beam 56 can be split into sub-beams 57 of smaller more manageable power with each sub-beam being scanned over some fraction of the full width of the metal strip. One beam 57 then is passed through an upcollimator 134 which increases the beam diameter and decreases the beam divergence. (If a large diameter beam with low divergence is produced by the laser, it may be necessary to down-collimate the beam to reduce the beam diameter to a more manageable size. A beam diameter from a 100 kW FEL laser may be many centimeters in diameter with a diffraction limited divergence so that down collimation may be necessary.) Upcollimated (or down-collimated) beam 136 is passed through a pair of mirrors 138 and 140 that direct a beam 142 at the proper angle into a scanning mechanism 144 that may be a rotating polygon or oscillating mirror 146. A beam 148 then is passed though a flat field focusing lens 150 focusing collimated beam 148 to a desired spot size 154 onto the surface of metal strip 40 to be descaled. An advantage of the scanned focused spot system is that it does not require the intensity distribution across the incoming laser beam to be spatially uniform. That is, homogenizer 60 would not be required. Another advantage is that the scanning mechanism allows the focused spot to be scanned transversely across oxide covered surface 44 so that the attached scale layer is removed by one or more pulses of laser radiation at each point along scan line 182 as metal strip 40 continuously passes through the transversely scanning focused laser spot. A disadvantage over the projected and focused laser line illustrated in FIG. 4A is that it adds more optical surfaces for additional loss of laser energy and it has a mechanical moving element.

As an alternative, flat field focusing lens 150 of FIG. 10A could be replaced with a pre-scanning focusing lens positioned ahead of oscillating mirror 146. The pre-scanning focusing lens would move back and forth in the beam propagation direction in synchronization with the scanning speed of the mirror to keep the spot focused on the flat metal surface.

Figure 10C:
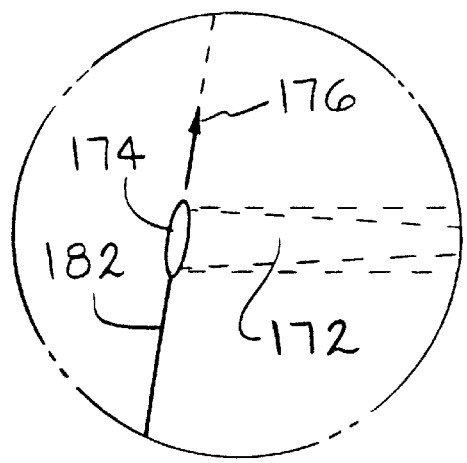
FIG. 10C illustrates in detail the incident focused elliptical spot of FIG. 10B.

FIG. 10B illustrates yet another embodiment of the invention for an optical scanning spot system that uses mirrors with a focusing lens to provide a telecentric scanning system to maintain a uniform spot size over the scan field width. Laser beam 136 is incident on a lens 156 positioned ahead of rotating scanning polygon 146 for redirecting a beam 158. A converging beam 159 then is directed toward a long rectangular flat mirror 160 extending for a large portion of the desired scan field. Mirror 160 redirects a scanned beam 162 to a curved parabolic mirror 164 extending the full width of the scan field. This curved mirror redirects a converging beam 166 so that it is incident on the surface at the same angle regardless of where across the scan field the beam is focused. The beam is focused to the same spot size all along the scan field length. This system has the advantage over the refractive system illustrated in FIG. 10A in that most of the optical elements are mirrors that do not have the absorptive losses of refractive elements. This is advantageous because of the high powers necessary for an economic full production laser descaling system. A long flat rectangular mirror 168 can be added to direct the focusing radiation to a long cylindrical concave focusing mirror 170 for converging the radiation into a convergent beam 172 to provide additional compression of the focused spot in strip travel direction 42. Full cross-width convergent cylindrical lens 34 could be used in place of mirrors 168 and 170 to focus the beam into a smaller down web dimension. This will result in a focused elliptical spot 174 with the long direction of the focused spot in scanning direction 176 as illustrated in greater detail in FIG. 10C.

EXAMPLE

An example will be provided to demonstrate the feasibility of the invention. An estimate can be made of the amount of energy and the projected strip processing speed needed to vaporize a 5 micron thick aluminum oxide, i.e., $Al_2O_3$, on an aluminum strip. This oxide layer is assumed to have a density of 4 gm/cm$^3$, a melting temperature of 2050° C., a vaporization temperature of 2980° C., a heat of fusion of 255 cal/gm, a heat of vaporization of 1138 cal/gm and a heat capacity of 0.32 cal/gm/°C. The source for this data is *Laser Institute of America Handbook: Guide for Material Processing by Lasers,* 2nd Edition, 1978, pp. 9–3, incorporated herein by reference. For this example, it will be assumed a projected laser line system such as that illustrated in FIG. 4A will be used to focus the laser radiation into a line. Also it will be assumed that there are ten such systems oriented side-by-side to descale a full 1 meter wide strip. It also is assumed a 100 kW FEL produces a beam split into ten sub-beams of 10 kW of laser radiation each and that these sub-beams are then each focused into a line 10 cm long by 2 mm wide. If it is assumed there is a 5 micron thick scale layer and a focused line of 10 cm long by 2 mm wide, the volume of aluminum oxide that must be vaporized is V=(0.0005 cm)(10 cm)(0.2 cm)=0.001 cm$^3$. The energy needed to vaporize this volume is E=(4 gm/cm$^3$)(0.001 cm$^3$)[(0.32 cal/gm/°C.)(2960°C.)+255 cal/gm+1138 cal/gm] (4.184 J/cal)=39.2 joules. If each of the ten sub-beams is delivering 10 kW of average power, the energy per pulse at a repetition rate of 30 MHz is 333 microjoules per pulse. Thus, the number of pulses required to deliver this 39.2 joules of energy is N=39.2 J/(0.000333 J/pulse)=117,720 pulses. Thus the dwell time of the beam at this point to deliver 117,720 pulses from the 30 MHz laser beam is T=(117,720 pulses)/(30,000,000 pulses/sec)=0.00392 sec. To determine the line speed necessary to remove this 5 micron thick layer, one requires an aluminum strip with the oxide layer can only move the width of the focused laser line, i.e., 2 mm, in the time it takes to deliver the full 117,720 pulses. Thus, the line speed is V=[0.002 m/0.00392 sec](60 sec/min)=30.6 m/min. Thus, if there were ten such beams of 10 kW each being focused to a line of 10 cm transverse length and each was oriented in a cross width contiguous fashion as illustrated in FIG. 5, then a full 1 m wide aluminum strip could have a 5 micron thick oxide layer removed from one side at a rate of 30.6 m/min. It should be pointed out the oxide removal rate may be higher due to other mechanisms of scale removal that may be operating because of the short pulse width and high surface power density. However, by this calculation based simply on a thermal vaporization mechanism, a 200 kW FEL laser would be required to descale both sides of this one meter wide aluminum strip at 30.6 m/min.

It will be understood various modifications may be made to the invention without departing from the spirit and scope of it. Therefore, the limits of the invention should be determined from the appended claims.

What is claimed is:

1. A method of removing oxide covering a metal surface, comprising:

providing a laser for producing electromagnetic radiation having a very short pulse width, a very high pulse repetition rate and a very high average power, producing radiation having a pulse width less than 1 nanosecond, a pulse repetition rate of at least 1 kHz and an average power of at least 1 kW, passing the radiation through at least one optical element to focus the radiation into an incident beam having a surface power density of at least about 5 MW/cm$^2$ at a point of contact with the metal surface, and passing the beam transversely completely across the oxide covering the metal surface to remove the oxide by vaporization by the interaction of one or more pulses of the radiation thereby forming an oxide free surface.

2. The method of claim 1 wherein the metal is a hot rolled or annealed strip traveling at a rate consistent with the pulse repetition rate.

3. The method of claim 1 wherein the metal surface is a surface of a strip traveling in a vertical direction at a rate of at least 10 m/min.

4. The method of claim 1 wherein the pulse width is less than 100 picoseconds.

5. The method of claim 1 wherein the pulse width is less than 10 picoseconds.

6. The method of claim 1 wherein the pulse has a width of about 1 femtosecond to 6 picoseconds.

7. The method of claim 1 wherein the pulse repetition rate is 1–40 MHz.

8. The method of claim 1 wherein the pulse repetition rate is from 40 MHz to 1 GHz.

9. The method of claim 1 wherein the average power is at least 10 kW.

10. The method of claim 1 wherein the average power is at least 100 kW.

11. The method of claim 1 wherein the surface power density is at least $10 \times 10^6$ watts/cm$^2$.

12. The method of claim 1 wherein the radiation has a photon wavelength in the ultraviolet range.

13. The method of claim 1 wherein the optical element comprises at least one lens.

14. The method of claim 1 wherein the optical element comprises at least one mirror.

15. The method of claim 1 wherein the optical element includes a combination of at least one lens and at least one mirror.

16. The method of claim 15 wherein said at least one lens and said at least one mirror are aligned.

17. The method of claim 1 wherein the optical element includes means for splitting the beam into a plurality of focused sub beams, each sub-beam having a power less than that of the beam.

18. The method of claim 1 wherein the optical element includes means for homogenization of the radiation to provide a relatively uniform spatial power distribution across the focused beam.

19. The method of claim 18 wherein the homogenization means includes a linear diverging lens having a sharp radius at an apex.

20. The method of claim 18 wherein the homogenization means includes a lens and a step-index optical fiber, the lens for focusing the radiation beam into one end of the fiber.

21. The method of claim 17 wherein each sub-beam is passed through means for homogenization to provide a relatively uniform spatial power distribution across each sub-beam.

22. The method of claim 18 wherein the radiation beam is focused into at least one line of uniform power distribution extending transversely across the entire width of the metal surface.

23. The method of claim 1 wherein the beam is focused into a spot, the method including the additional step of traversing the spot transversely across the entire width of the metal surface.

24. The method of claim 1 wherein the beam contacts the metal surface at an acute angle.

25. The method of claim 24 wherein the angle is 10–75°.

26. The method of claim 24 wherein the angle is 25–60°.

27. The method of claim 1 including the additional step of collecting the vaporized oxide into a powder.

28. The method of claim 1 including the additional steps of protecting the point of contact and the oxide free surface, and sweeping away the removed oxide with a non-oxidizing gas under reduced pressure.

29. The method of claim 1 including the additional steps of collecting the removed oxide with a non-oxidizing gas under reduced pressure, separating the removed oxide as a powder from the non-oxidizing gas, and recycling the separated non-oxidizing gas to the point of contact.

30. The method of claim 13 wherein the optical element is a combination of aligned lens comprising a first optical element being a spherical divergent lens, a second optical element being a cylindrical lens for vertically collimating the beam, a third optical element being a cylindrical lens for horizontally collimating the beam, and a fourth optical element being a cylindrical lens for focusing the beam into a narrow line.

31. The method of claim 14 wherein the optical element is a combination of aligned elements comprising a first optical element being a circular divergent convex mirror, a second optical element being a cylindrical concave mirror for vertically collimating the beam, a third optical element being a cylindrical concave mirror for horizontally collimating the beam, a fourth optical element being a flat mirror for redirecting the beam, and a fifth optical element being a cylindrical concave mirror for focusing the beam into a narrow line.

32. The method of claim 15 wherein the combination includes, a first optical element being a collimating lens, a second element being at least one directing mirror to orient the collimated beam, and means for scanning the collimated beam.

33. The method of claim 32 wherein the collimating lens is an upcollimating lens or a downcollimating lens.

34. The method of claim 32 wherein the optical elements further include a flat field scanning lens and the scanning means includes a rotating mirror for repetitively scanning the collimated beam across an entrance pupil of the flat field lens.

35. The method of claim 15 wherein the combination is a telecentric system including, a rotating mirror for scanning the beam, a parabolic mirror for redirecting the scanned beam at the same angle to the surface regardless of where across the scan field the beam is focused to the surface.

36. The method of claim 35 wherein the combination includes a focusing lens ahead of the rotating mirror.

37. The method of claim 35 wherein the combination includes a focusing mirror following the parabolic mirror.

38. A method of removing oxide covering a surface of metal strip, comprising:

providing a laser for producing electromagnetic radiation having a pulse width less than 10 picoseconds, a pulse repetition rate of at least 10 MHZ and an average power greater than 10 kW, producing radiation having a pulse width less than 10 picoseconds, a pulse repetition rate of at least 10 MHZ and an average power greater than 10 kW, passing the radiation through at least one optical element to focus the radiation into at least one incident beam having a surface power density of at least about 10 $MW/cm^2$ at a point of contact with the surface of the metal strip, the optical element including means for homogenization of the radiation and at least one of a cylindrical convergent lens or a cylindrical concave mirror to focus the homogenized radiation into said at least one beam, passing the metal strip through the at least one beam, such that said at least one beam passes transversely completely across the oxide covering the surface of the metal strip, to remove the oxide by vaporization by the interaction of one or more of the pulses of the radiation thereby forming an oxide free surface.

* * * * *